United States Patent
Boufounos et al.

(10) Patent No.: US 9,519,618 B2
(45) Date of Patent: Dec. 13, 2016

(54) SYSTEM AND METHOD FOR DETERMINING DISTANCE BETWEEN SIGNALS

(71) Applicant: Mitsubishi Electric Research Laboratories, Inc., Cambridge, MA (US)

(72) Inventors: Petros T. Boufounos, Boston, MA (US); Shantanu Rane, Menlo Park, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/294,268

(22) Filed: Jun. 3, 2014

(65) Prior Publication Data

US 2015/0349949 A1    Dec. 3, 2015

(51) Int. Cl.
| | |
|---|---|
| G06F 17/10 | (2006.01) |
| H04W 12/08 | (2009.01) |
| G06K 9/00 | (2006.01) |
| H04L 9/00 | (2006.01) |
| G06K 9/62 | (2006.01) |
| G09C 1/00 | (2006.01) |

(52) U.S. Cl.
CPC .......... *G06F 17/10* (2013.01); *G06K 9/00536* (2013.01); *G06K 9/6215* (2013.01); *G09C 1/00* (2013.01); *H04L 9/008* (2013.01); *H04W 12/08* (2013.01); *H04L 2209/80* (2013.01)

(58) Field of Classification Search
CPC ..................................................... G06F 17/10
See application file for complete search history.

(56) References Cited

U.S. PATENT DOCUMENTS

| | | | |
|---|---|---|---|
| 2009/0116590 A1* | 5/2009 | Lee ...................... | H04B 7/0413 375/341 |
| 2010/0329448 A1 | 12/2010 | Rane et al. | |
| 2014/0300773 A1* | 10/2014 | Voronov .............. | H04N 5/2353 348/229.1 |

OTHER PUBLICATIONS

Rane s et al: "Privacy-preserving nearest neighbor methods: comparing signals without revealing them" IEEE Signal Processing Magazine, val. 30, No. 2, Mar. 2013 (Mar. 2013). pp. 18-28, XP011505541, ISSN: 1053-5888, DOI: 10.1109/MSP.2012. 2230221 paragraphs 1-3 section "PPNN with computational privacy" figure 1.

\* cited by examiner

*Primary Examiner* — Saleh Najjar
*Assistant Examiner* — Simon Kanaan
(74) *Attorney, Agent, or Firm* — Gene Vinokur; James McAleenan; Hironori Tsukamoto

(57) ABSTRACT

A pairwise distance computation transforms first and second signals using an absolute distance preserving mapping, such that a k-norm distance between the first mapped signal and the second mapped signal represents an absolute distance between the first signal and the second signal. The absolute distance preserving mapping maps an element of a first or a second signal to a vector having a size equal to a cardinality of the finite alphabet of the signals. The absolute distance preserving mapping determines a position N of the element in an ordered sequence of symbols of the finite alphabet and determines values for each of N elements of the vector as a fractional power 1/k of positive increments in the finite alphabet. The values for subsequent elements of the vector are determined as zero.

13 Claims, 6 Drawing Sheets

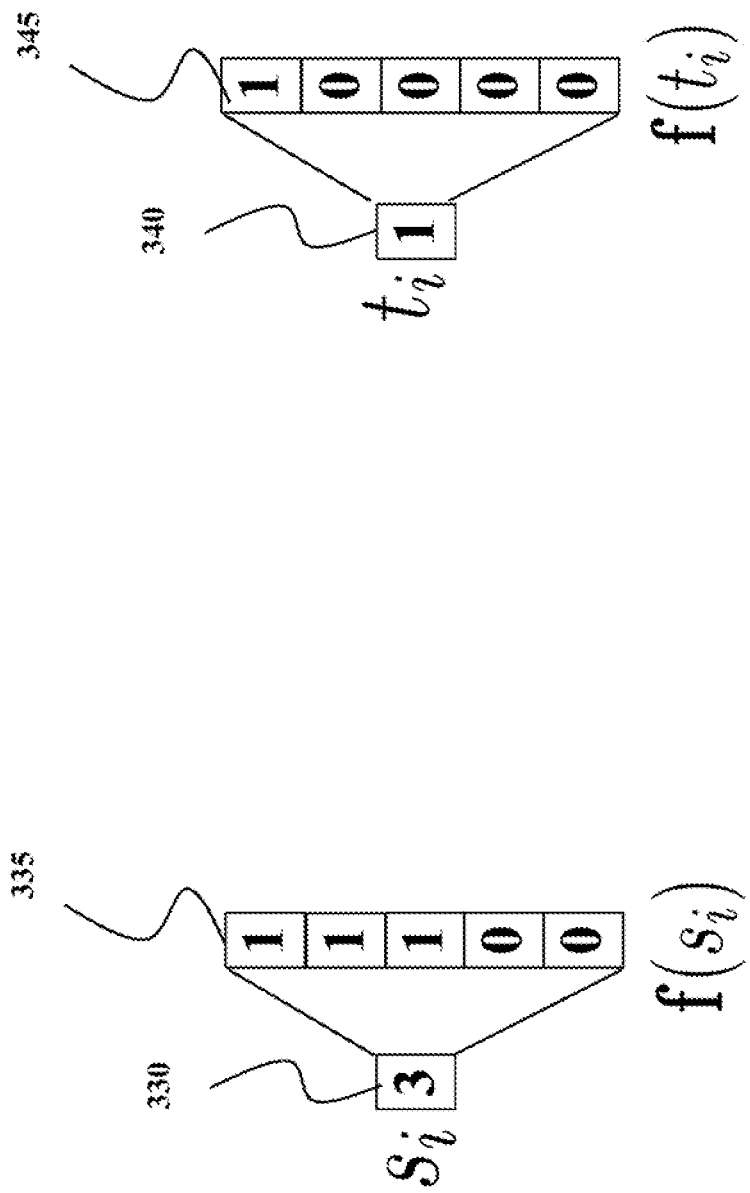

SYSTEM AND METHOD FOR DETERMINING DISTANCE BETWEEN SIGNALS

FIELD OF THE INVENTION

This invention relates generally to pairwise distance computation, and more particularly to computation of absolute distances between signals with or without privacy constraints.

BACKGROUND OF THE INVENTION

Secure distance computation is performed when there are privacy constraints on one or both the signals. One way to solve this problem is to use encryption functions that allow computation in the ciphertext space. Such cryptosystems are called homomorphic cryptosystems. Many protocols based on homomorphic cryptosystems have been developed. Applications include secure computing, wherein a client processor can send encrypted data to a server. The server interacts with the client to solve a mathematical problem without revealing data to untrusted third parties. The protocols include, among other things, polynomial function computation primitives, which allow computation of Euclidean distance (L2 norm), L3 norm, correlation, etc. However, there are no efficient protocols for computing the absolute distance between pairs of signals under privacy constraints.

Accordingly, there is a need for a method for determining an absolute distance between two signals such that this method is suitable for secure computation of such an absolute distance.

SUMMARY OF THE INVENTION

The "distance" between two signals can serve as a measure of the similarity between the signals. One object of some embodiments of the invention is to provide a method for determining an absolute distance between two signals. Another object of some embodiments is to provide such a method that is suitable for secure computation of the absolute distances between signals.

Some embodiments include converting the absolute distance computation into a k-norm distance computation, e.g., a polynomial distance computation. The embodiments allow reusing computation primitives originally constructed for determining polynomial distances (such as Euclidean distance) in the determination of the absolute distance.

For example, some embodiments map the original signals to new signals such that a suitably selected polynomial distance function computed on pairs of the new mapped signals is approximately equal to the absolute distance between the underlying pairs of original input signals. This absolute distance preserving mapping expresses each scalar dimension of the input signal as a vector having length exactly equal to the cardinality of the scalar alphabet, and the values of the elements of the vector are selected according to the polynomial distance computation primitive that is available.

For example, the absolute distance preserving mapping of an element of the signal includes determining a position N of the element in a vector of symbols of the finite alphabet arranged in an order, determining values for each of the first N elements or the last N elements of the vector as a fractional power of positive increments in the finite alphabet, wherein the fractional power is reciprocal of a positive; and determining values for subsequent elements of the vector as zero.

Accordingly, one embodiment of the invention discloses a method for pairwise distance computation. The method includes transforming a first signal into a first mapped signal using an absolute distance preserving mapping; and transforming a second signal into a second mapped signal using the absolute distance preserving mapping, such that a k-norm distance between the first mapped signal and the second mapped signal represents an absolute distance between the first signal and the second signal. The elements of the first signal and the second signal are selected from a finite alphabet, wherein the absolute distance preserving mapping maps an element of a first or a second signal to a vector having a size equals to a cardinality of the finite alphabet. The steps of the method are performed by a processor.

Another embodiment discloses a system including a sensor for determining a signal, wherein elements of the first signal are selected from a finite alphabet; a processor for transforming the signal into a mapped signal using an absolute distance preserving mapping, such that each element of the signal is mapped to a vector in the mapped signal, wherein a size of the vector equals to a cardinality of the finite alphabet; and a memory for storing the mapped signal.

Yet another embodiment discloses a method for pairwise distance computation including steps for receiving a first signal representing an output of a sensor, wherein elements of the first signal are selected from a finite alphabet; transforming, using a processor, the first signal into a first mapped signal using an absolute distance preserving mapping, such that each element of the first signal is mapped to a vector in the first mapped signal, wherein a size of the vector equals to a cardinality of the finite alphabet; and storing the first mapped signal in a memory.

In various embodiments, the absolute distance preserving mapping includes determining a position N of the element in an ordered sequence of symbols of the finite alphabet; determining values for each of N elements of the vector as a fractional power $1/k$ of positive increments in the finite alphabet, wherein k is a positive number, and determining values for subsequent elements of the vector as zero.

BRIEF DESCRIPTION OF THE DRAWINGS

FIGS. 3A and 3B and 3C are schematics of an example of absolute distance preserving mapping according to embodiments of the invention;

DETAILED DESCRIPTION OF THE PREFERRED EMBODIMENTS

Figure 1:
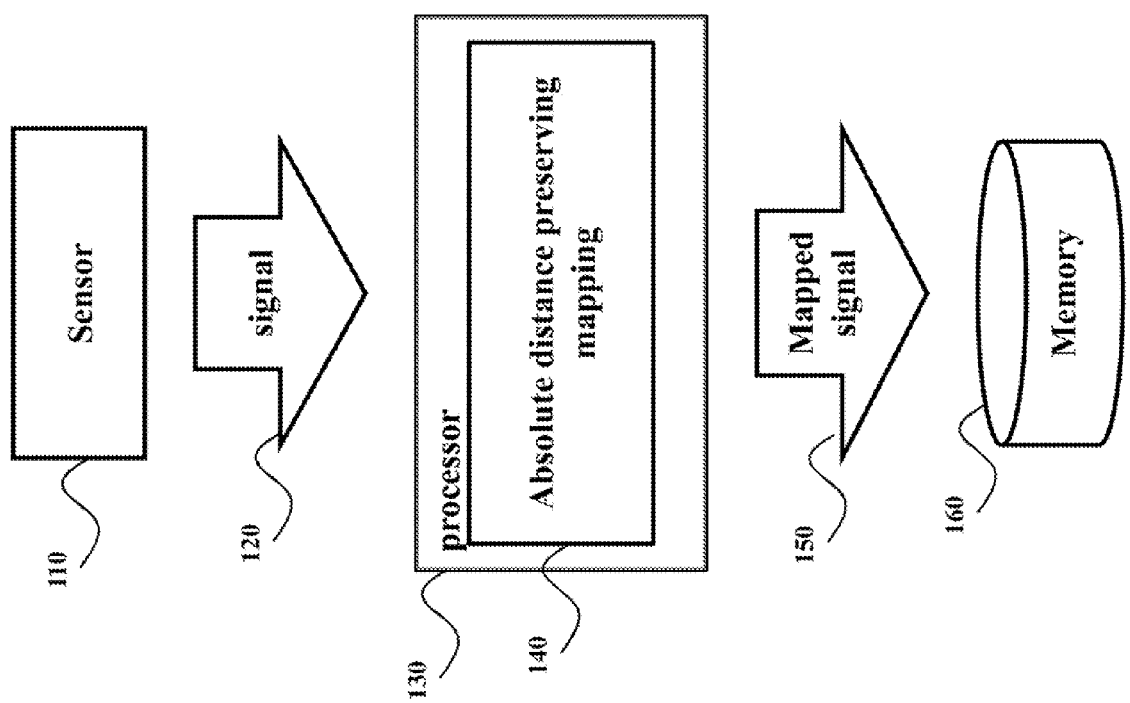
FIG. 1 is a schematic of an overview of processing signals using an absolute distance preserving mapping according to embodiments of the invention.

FIG. 1 shows an overview of processing signals using an absolute distance preserving mapping of a signal 120. The signals can be an output of a sensor 110. Examples of the sensor 110 include a camera, e.g., an image or a depth camera, a biometric sensor, and an acoustic or light sensor. Examples of the signal 120 include intensities values or depth values of pixels in an image, or values of minutia in a fingerprint. In various embodiments, elements of the signal are selected from a finite alphabet. For example, the elements of the signal can be (8 bit) integers with values varying from 0 till 255. However, it should be understood that the method can be applied to other types of signals.

Various embodiments of the invention map 140 the signal 120 into a mapped signal 150 that can be stored in a memory 160 or used for subsequent processing and/or distance computation. The mapping is an absolute distance preserving mapping than can be performed by a processor 130. The processor 130 can be operatively connected to the sensor 110 and/or the memory 160.

The method can be performed in a processor connected to memory and input/output interfaces by buses as known in the art. The processor can be a client processor, a server processor, or a combination of client and server processors. For example, in a privacy preserving secure application, some of the steps are performed in the client and other steps are performed in a server in such a way that the signals or data and methodologies of either processor are revealed to the other processor. For example, the client is a low complexity, limited resource processor that generates the signals. The server can have unlimited resources and performs the mapping. Then, the results of the mapping can be stored in a memory or transferred back to the client to enable the client to assess a level of similarity (or dissimilarity) between the signals.

Some embodiments of an invention are based on a realization that an absolute distance between a pair of signals is related to a value of an alternative distance function applied to a pair of mapped signals. For signals that are discrete and bounded, this relation is one of an exact equality. For signals that are bounded, but not necessarily discrete, this relation is one of an approximate equality, where the approximation results from discretization (quantization) of continuous values of the signal being processed.

Figure 2:
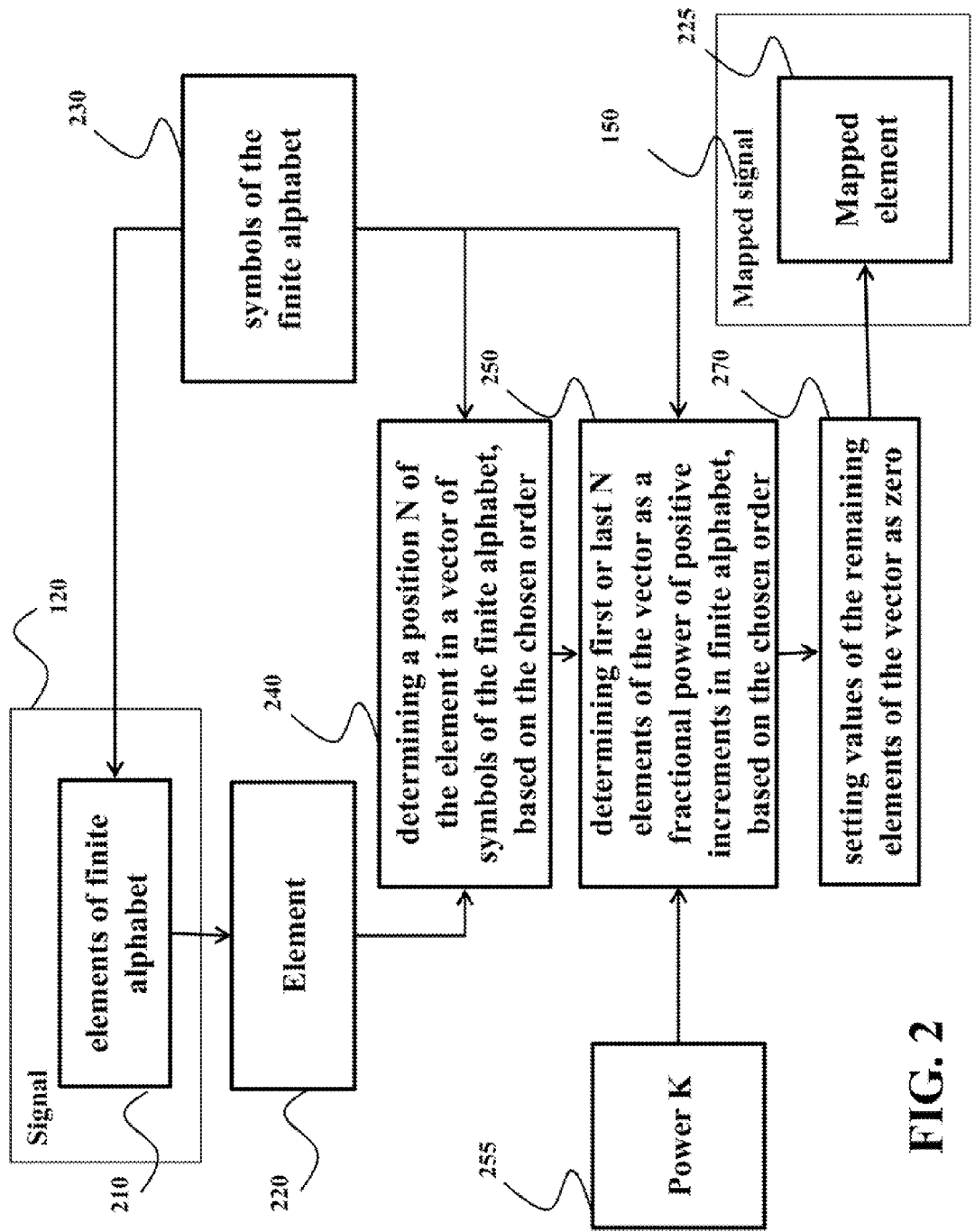
FIG. 2 is a block diagram of the absolute distance preserving mapping according to embodiments of the invention.

FIG. 2 shows a block diagram of the absolute distance preserving mapping according to some embodiments. The elements 210 of the signal 120 have values selected from the finite alphabet 230. Each element, e.g., an element 220, of the signal 120 is mapped to a vector 225 in the mapped signal 150. A size of the vector 225 equals to a cardinality of the finite alphabet 230.

Figure 3A:
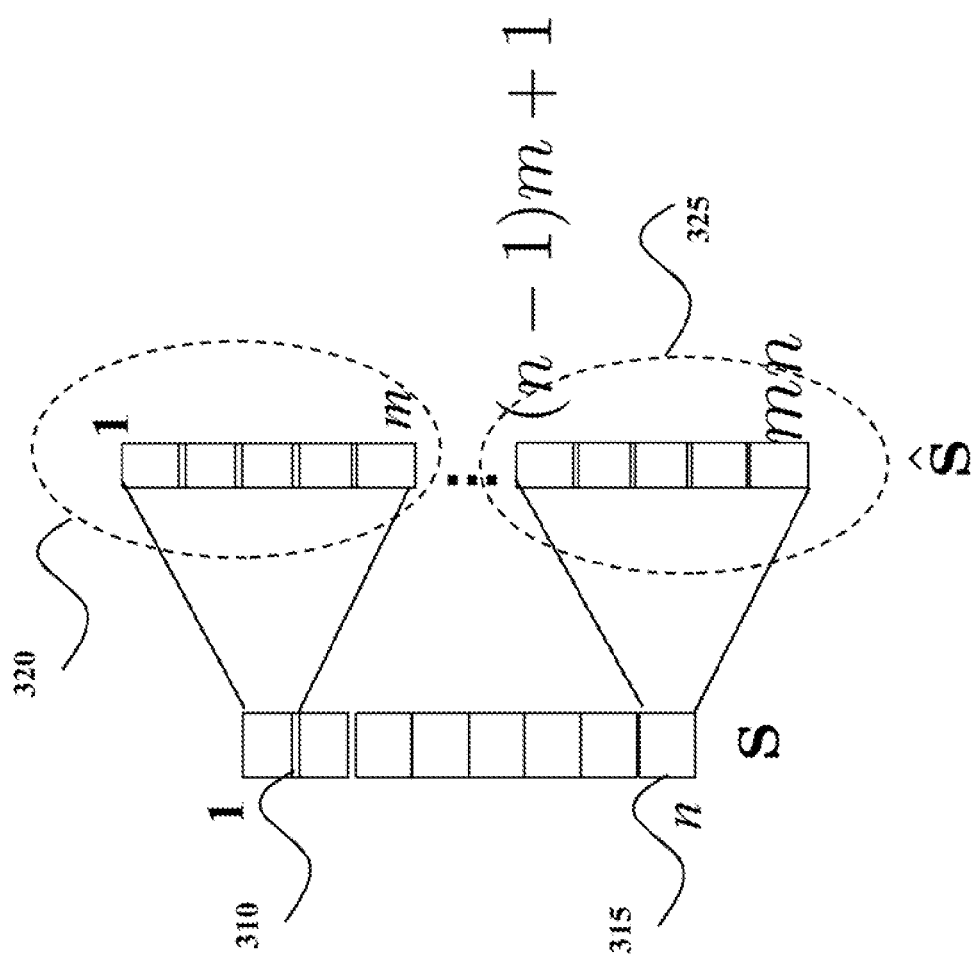

FIG. 3A illustrates the mapping of the elements of the signal 120 to vectors of the mapped signal 150. For example, an element 310 is mapped to a vector 320. An element 315 is mapped to a vector 325. If the size of the signal in and the cardinality of the finite alphabet is in, then the size of the mapped signal is mn. In this example, m equals five, so the sizes of vectors 320 and 325 are five.

In some embodiments of the invention, the absolute distance preserving mapping of an element 220 determines 240 a position N of the element in an ordered sequence of symbols of the finite alphabet 230. For example, the N elements of the vector can be the first N elements or the last N elements of the vector, and the ordered sequence of symbols of the finite alphabet can be arranged in an ascending or a descending order.

Also, the absolute distance preserving mapping of an element 220 determines 250 values for each of the N elements of the vector as a fractional power 1/k of positive increments in the finite alphabet 230 wherein k 255 is a positive number, and determining 270 values for subsequent elements of the vector as zero.

FIG. 3B shows an example of the absolute distance preserving mapping f of an elements 330 $s_i$ having a value 3 selected from a finite alphabet with possible values 1, 2, 3, 4, and 5. The value 3 has a third position in the finite alphabet, i.e., N=3. The positive increments in the finite alphabet equal one, i.e., 2−1=1, 3−2=1, 4−3=1, and 5−4=1. Because the positive increments all are one, for any value of the power k, the first three element of the mapped vector 335 are one, and the other two values are zero.

FIG. 3C shows another example of the absolute distance preserving mapping f of an elements 340 $s_i$ having a value 1. In this case, N=1, so only the first element of the mapped vector 345 is one, the values of the other elements are zeroes.

The concept underlying the mapping is that each scalar component of the signal is expressible in vector form, wherein the individual components of the vector depend on the relationship (≤, =, ≥) between the scalar component of the signal and each possible value that the signal can take, where the possible value that the signal can take are ordered, e.g., from lowest to highest.

For example, the finite alphabet set
$$\mathcal{X} = \{a_1, a_2, \ldots, a_i, a_{i+1}, \ldots, a_m\}$$
where
$$a_1 < a_2 < \ldots < a_i < a_{i+1} < \ldots < a_m$$

Assume without loss of generality that $a_1 > 0$ If the original alphabet had some negative values, then some embodiments add an appropriate constant to all alphabet symbols such that all of the symbols of the alphabet are non-negative.

Let the vector constructed from these ordered elements be denoted by $a=(a_1, \ldots, a_m)$. Some embodiments represent the absolute distance between two vectors s, $t \in \mathcal{X}^n$, in terms of a different distance measure, e.g., the $L_k$ norm between two different vector valued signals, $\hat{s}$ and $\hat{t}$ where the integer, k>1, and the norm is defined as:

$$\|\hat{s} - \hat{t}\|_k = \sum_i^{mn} |\hat{s}_i - \hat{t}_i|^k$$

In the above expression, the vectors, $\hat{s}$ and $\hat{t}$ are related (respectively) to the vectors s and t by the absolute distance preserving mapping.

The absolute distance preserving mapping constructs a vector b of length n using the m ordered elements of $\mathcal{X}$ such that $b_1 = a_1$ and $b_j = (a_j - a_{j-1})$ for j=1, 2, ..., m. By construction, the values of the elements of b are all positive increments such that:

$$\sum_j^u b_j = a_u$$

where
$$1 \leq u \leq m.$$

Each possible value $a_i$ in the alphabet set $\mathcal{X}$ is mapped with a vector-valued function $f(a_i)$ including m elements, where each individual element of this vector valued function is given by $$f_j(a_i) = \begin{cases} b_j^{1/k} & \text{for } j \le i, \\ 0 & \text{for } i < j \le m. \end{cases}$$

Thus, each element of $f(a_i)$ is either a fractional power of positive increments of elements in $\mathcal{X}$ or has a zero value.

Given the candidate vectors s and t above, some embodiments construct the new vectors $\hat{s}$ and $\hat{t}$ whose elements are given by $\hat{s}_i = f(s_i)$ and $\hat{t}_i = f(t_i)$ where the mapping function is as described above.

Now, it is straightforward to verify that $$\|\hat{s} - \hat{t}\|_k = \sum_i^{mn} |\hat{s}_i - \hat{t}_i|^k = \sum_i^n |s_i - t_i| = \|s - t\|_1.$$

Thus, the absolute distance between s and t has been expressed as k-norm distance between $\hat{s}$ and $\hat{t}$. If there exist computation primitives that can accept as inputs $\hat{s}$ and $\hat{t}$, and work with the distance metric $\|\hat{s}-\hat{t}\|_k$, for k>1, is a finite real number, then these primitives can be used for distance-based computations on the vector s and t. Furthermore, if there exist mappings of $\hat{s}$ and $\hat{t}$ that preserve distance in the $L_k$ normed-metric space, then these mappings can be used to preserve the absolute distance between vectors s and t.

Figure 4:
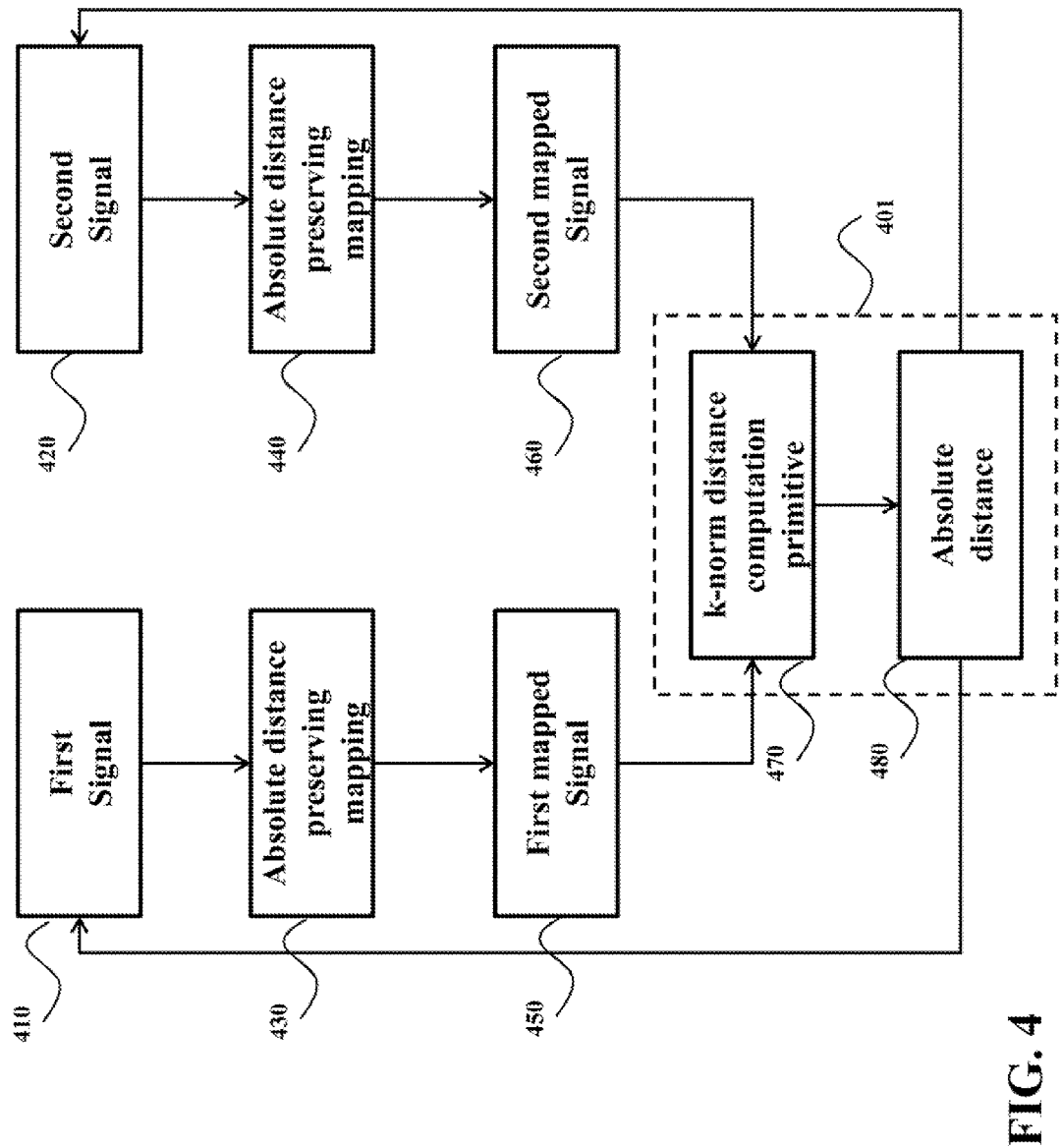
FIG. 4 is a block diagram of a method for determining the absolute distance preserving mapping according to embodiments of the invention.

FIG. 4 shows a block diagram of a method for determining the absolute distance when a computation primitive is available for k-norm distances according to one embodiment of the invention. The method can be performed using a processor, such as the processor 130. Additionally or alternatively, at least part of the method can be performed by a processor of a pairwise distance computation unit 401, which can be a different processor. The pairwise distance computation unit can be operatively connected to the memory 160.

The method transforms 430 a first signal 410 into a first mapped signal 450 using the absolute distance preserving mapping and transforms 440 a second signal 420 into a second mapped signal 460 using the absolute distance preserving mapping. The elements of the first and the second signals are selected from the same finite alphabet.

Next, the method determines 470 a k-norm distance between the first mapped signal and the second mapped signal to produce an absolute distance 480 between the first signal and the second signal. For example, the distances are Euclidean distances when, k is two.

The Euclidean distances between two signals can be determined using various methods, including methods that can be performed in a secure manner. Thus, some embodiments can determine the absolute distance between two signals, and also can determine such an absolute distance securely.

Embodiments of the invention use different methods for determining securely the k-norm distance between the first mapped signal 450 and the second mapped signal 460. For example, one embodiment determines the squared Euclidian distance between the signals. This embodiment expresses the squared Euclidian distance function as a linear combination of homomorphic components to determine the squared distance based on homomorphic transformation, as described in the U.S. Publication No. 2010/0329448. The homomorphic component is an algebraic combination of the signal 450 and/or the signal 460, such that the encrypted result of the algebraic combination can be determined directly from encrypted versions of the signals using homomorphic properties.

Figure 5:
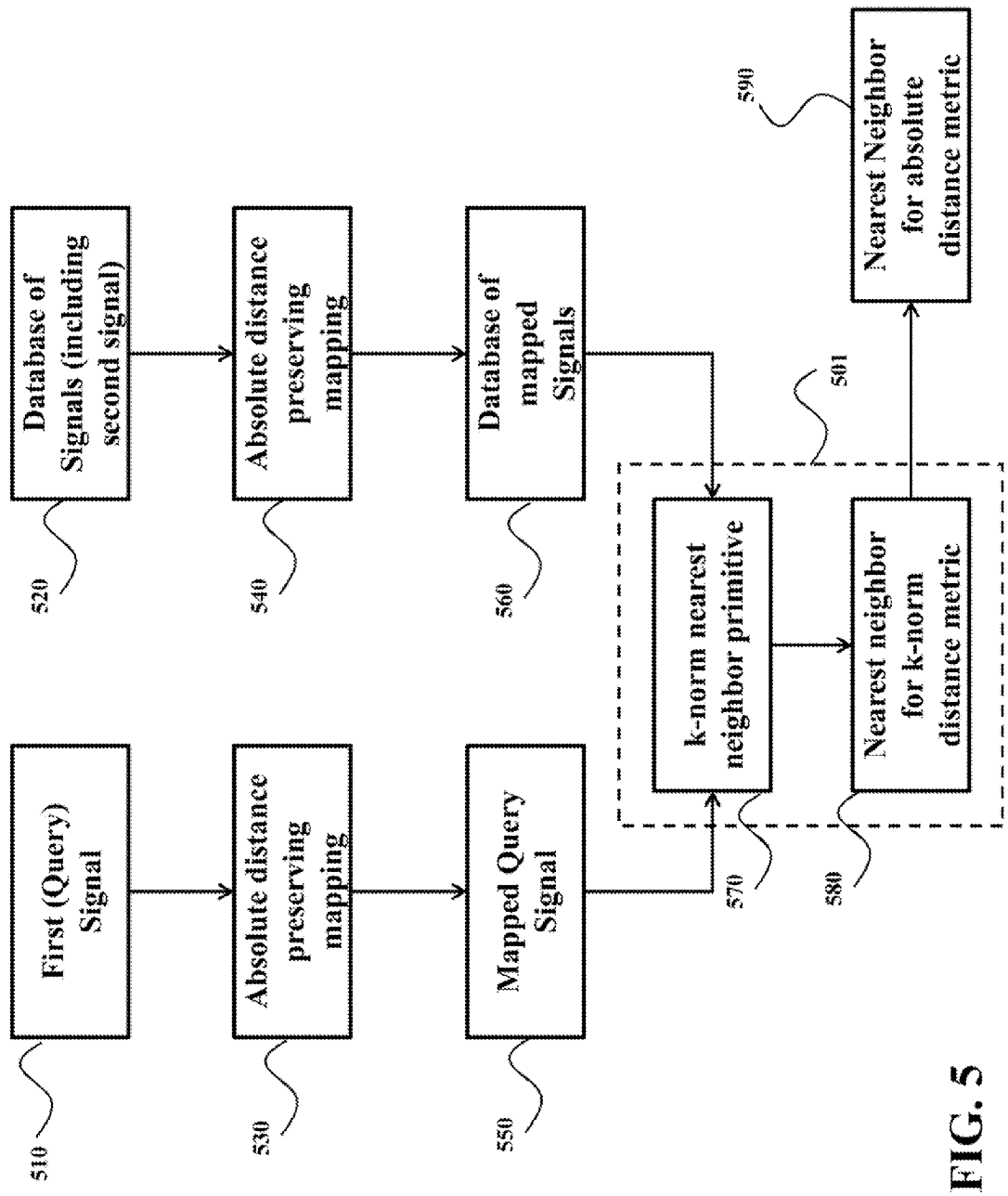
FIG. 5 is a block diagram of a method for performing nearest neighbor search based on k-norm distance metric according to embodiments of the invention.

FIG. 5 shows a block diagram of a method for performing nearest neighbor search based on the absolute distance metric, when a nearest neighbor primitive is available for a k-norm distance metric, according to one embodiment of the invention. The method can be performed using a processor, such as the processor 130. Additionally or alternatively, at least part of the method can be performed by a processor of a nearest neighbor computation unit 501, which can be a different processor. The nearest neighbor computation unit can be operatively connected to the memory 160.

A nearest neighbor search occurs between a query signal 510 and a database of signals 520 according to a distance metric. In a nearest neighbor search, the distance or an approximate distance between the signals in the database and the query signal is explicitly or implicitly computed. The output of this search can be the signal in the database with the smallest distance or approximate distance, a pointer to that signal in the database, or information pertaining to that signal, also stored in the database.

This embodiment operates similarly to the embodiment in FIG. 4, in transforming 530 a query signal 510 into a mapped query signal 550 using the absolute distance preserving mapping and transforming 540 a database of signals 520 into a database of mapped signals 560 by transforming each signal in the database of signals using the absolute distance preserving mapping. The elements of the query signal and of the signals in the database of signals are selected from the same finite alphabet.

Next, the method uses a k-norm nearest neighbor primitive 570 to perform a k-norm nearest neighbor search of the mapped query signal and the database of mapped signals, which produces a nearest neighbor for the k-norm distance metric 580 between the mapped query signal and the database of mapped signals. The nearest neighbor for the k-norm distance metric of the mapped query signal in the database of mapped signals corresponds to the nearest neighbor for the absolute distance metric 590 of the query signal in the database of signals.

In alternative embodiments, the k-norm nearest neighbor primitive may be replaced by an approximate k-norm near neighbor primitive, which selects one or more signals from the database of mapped signals which have small distance with the mapped query signal, according to the k-norm distance metric, but not necessarily the nearest neighbor. Other similar search or comparison primitives using a k-norm distance metric can also be used in alternative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer-implemented method for computing pairwise distance using a processor connected to an input/output interface and signal data stored in a memory connected to the processor via the interface connected to a sensor, comprising:

transforming a first signal data into a first mapped signal data using an absolute distance preserving mapping stored in the memory;

transforming a second signal data into a second mapped signal data using the absolute distance preserving mapping, such that a k-norm distance between the first mapped signal data and the second mapped signal data represents an absolute distance between the first signal data and the second signal data, wherein the second signal data is stored in a database of signal data, wherein elements of the first signal data and the second signal data are selected from the signal data corresponding to a finite alphabet, wherein the absolute distance preserving mapping maps an element of a first signal data or a second signal data to a vector having a size equals to a cardinality of the finite alphabet, wherein steps of the method are performed by the processor, wherein the k-norm distance is determined securely in an encrypted domain, wherein the second mapped signal data is stored in the database of signal data; and querying the database of mapped signal data using the k-norm distance with the first mapped signal data to determine at least one nearest neighbor signal data for a k-norm distance metric, and wherein the absolute distance preserving mapping, comprises:

determining a position N of the element in an ordered sequence of symbols of the finite alphabet;

determining values for each of N elements of the vector as a fractional power 1/k of positive increments in the finite alphabet, wherein k is a positive number, and determining values for subsequent elements of the vector as zero.

2. The method of claim 1, further comprising:
determining the k-norm distance between the first mapped signal data and the second mapped signal data to produce the absolute distance between the first signal data and the second signal data.

3. The method of claim 1, wherein the k-norm distance is a squared Euclidian distance determined as a linear combination of homomorphic components of the first mapped signal data and the second mapped signal data.

4. The method of claim 1, wherein the N elements of the vector are the first N elements or the last N elements of the vector.

5. The method of claim 1, wherein the first signal data and the second signal data are received from the sensor.

6. The method of claim 5, wherein the sensor is a camera and the first signal data and the second signal data include values of pixels in images acquired by the camera.

7. The method of claim 1, wherein the k-norm distance includes a k-norm distance nearest neighbor search.

8. The method of claim 1, wherein the k-norm distance includes a k-norm distance approximate near neighbor search.

9. The method of claim 1, wherein the database of signal data includes information corresponding to each signal data, further comprising
retrieving, from the database, the information corresponding to the nearest neighbor signal data.

10. A system, comprising:
a sensor configured to determine and output signal data, wherein elements of a first signal data stored in a memory are selected from the signal data corresponding to a finite alphabet;
a processor configured to transform the signal data received from the sensor into a mapped signal data using an absolute distance preserving mapping, such that each element of the signal data is mapped to a vector in the mapped signal data, wherein a size of the vector equals to a cardinality of the finite alphabet, wherein a k-norm distance is determined securely in an encrypted domain, wherein the mapped signal data is stored in a database of mapped signal data; and
querying the database of mapped signal data using the k-norm distance with the first mapped signal data to determine at least one nearest neighbor signal data for a k-norm distance metric, wherein a k-norm distance is determined securely in an encrypted domain, and wherein the absolute distance preserving mapping of an element comprises:
determining a position N of the element in an ordered sequence of symbols of the finite alphabet;
determining values for each of N elements of the vector as a fractional power 1/k of positive increments in the finite alphabet, wherein k is a positive number; and
determining values for subsequent elements of the vector as zero, wherein the memory stores the mapped signal data.

11. The system of claim 10, wherein the memory stores a first mapped signal data transformed from a first signal data using the absolute distance preserving mapping and stores a second mapped signal data transformed from a second signal data using the absolute distance preserving mapping, further comprising:
a pairwise distance computation unit operatively connected to the memory for determining the k-norm distance between the first mapped signal data and the second mapped signal data to produce an absolute distance between the first signal data and the second signal data.

12. A computer-implemented method for computing pairwise distance using a processor and signal data stored in a memory connected to the processor, comprising:
receiving a first signal data representing an output of a sensor, wherein elements of the first signal data are selected from the signal data corresponding to a finite alphabet, wherein the signal data is stored in a database of signal data;
transforming, using the processor, the first signal data into a first mapped signal data using an absolute distance preserving mapping, such that each element of the first signal data is mapped to a vector in the first mapped signal data, wherein a size of the vector equals to a cardinality of the finite alphabet;
transforming the signal data in the database using the absolute distance preserving mapping to produce a database of mapped signal data; and
querying the database of mapped signal data using the k-norm distance with the first mapped signal data to determine at least one nearest neighbor signal data for a k-norm distance metric, wherein a k-norm distance is determined securely in an encrypted domain, and wherein the absolute distance preserving mapping of an element comprises:
determining a position N of the element in an ordered sequence of symbols of the finite alphabet;
determining values for each of N elements of the vector as a fractional power 1/k of positive increments in the finite alphabet, wherein k is a positive number, and
determining values for subsequent elements of the vector as zero; and
storing the first mapped signal data in the memory.

13. The method of claim 12, further comprising:
transforming a second signal data into a second mapped signal data using the absolute distance preserving mapping; and determining the k-norm distance between the first mapped signal data and the second mapped signal data to produce an absolute distance between the first signal data and the second signal data.

* * * * *